US008531722B2

(12) United States Patent
Kim et al.

(10) Patent No.: US 8,531,722 B2
(45) Date of Patent: Sep. 10, 2013

(54) COLOR COMPENSATION APPARATUS AND METHOD, IMAGE FORMING APPARATUS, AND COMPUTER READABLE RECORDING MEDIUM

(75) Inventors: Se-eun Kim, Suwon-si (KR); Kyeong-man Kim, Yongin-si (KR); Hyun-soo Oh, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 818 days.

(21) Appl. No.: 12/645,943

(22) Filed: Dec. 23, 2009

(65) Prior Publication Data

US 2010/0182619 A1      Jul. 22, 2010

(30) Foreign Application Priority Data

Jan. 22, 2009   (KR) .................. 10-2009-0005490

(51) Int. Cl.
*H04N 1/60*      (2006.01)
(52) U.S. Cl.
USPC ............ 358/1.9; 358/2.1; 358/3.23; 358/518; 358/519; 358/521
(58) Field of Classification Search
None
See application file for complete search history.

(56) References Cited

U.S. PATENT DOCUMENTS

| | | | | |
|---|---|---|---|---|
| 7,187,386 B2* | 3/2007 | Rice et al. | ...................... | 345/589 |
| 7,286,265 B2* | 10/2007 | Kuwata et al. | ................. | 358/1.9 |
| 7,593,120 B2* | 9/2009 | Kitora et al. | ................. | 358/1.13 |
| 7,738,139 B2* | 6/2010 | Szilagyi et al. | ................. | 358/1.9 |
| 2002/0044686 A1* | 4/2002 | Yamazaki | ...................... | 382/167 |
| 2004/0100478 A1* | 5/2004 | Bianchi et al. | ................ | 345/690 |
| 2004/0257622 A1* | 12/2004 | Shibaki et al. | ................. | 358/2.1 |
| 2007/0263009 A1* | 11/2007 | Li et al. | ........................ | 345/601 |
| 2008/0317340 A1* | 12/2008 | Ahn et al. | ..................... | 382/167 |
| 2009/0046171 A1* | 2/2009 | Kogan et al. | ............... | 348/223.1 |

FOREIGN PATENT DOCUMENTS

JP       2006058950       3/2006

* cited by examiner

*Primary Examiner* — Dung Tran
(74) *Attorney, Agent, or Firm* — Stanzione & Kim, LLP

(57) ABSTRACT

A color compensation apparatus, a color compensation method, an image forming apparatus, and a computer readable recording medium are provided. The color compensation apparatus includes a color scheme analyzing unit to classify an input image into one or more objects and to compute average color values for each of the classified one or more objects, a storage unit to store a color table proposed for color compensation, and a color compensating unit to compensate the average color values computed for each of the classified one or more objects using colors of the stored color table which match the computed average color values.

22 Claims, 10 Drawing Sheets

FIG. 6

| Colors | First coloration scheme | Second coloration scheme | Third coloration scheme |
|---|---|---|---|
| Main color | Red | Blue | Blue |
| First sub-color | Blue | Yellow | Light Blue |
| Second sub-color | Green | Green | Yellow |
| Third sub-color | Pink | Light Red | Green |
| Fourth sub-color | White | Red | Gray |
| ... | ... | ... | ... |

{ 600

COLOR COMPENSATION APPARATUS AND METHOD, IMAGE FORMING APPARATUS, AND COMPUTER READABLE RECORDING MEDIUM

CROSS-REFERENCE TO RELATED APPLICATIONS

This application claims the benefit under 35 U.S.C. §119 (a) from Korean Patent Application No. 10-2009-0005490, filed on Jan. 22, 2009, in the Korean Intellectual Property Office, the disclosure of which is incorporated herein by reference in its entirety.

BACKGROUND

1. Field of the Invention

The present general inventive concept relates to a color compensation apparatus, a color compensation method, an image forming apparatus, and a computer readable recording medium. More particularly, the present general inventive concept relates to a color compensation apparatus capable of compensating an input image using a color scheme proposed by an expert, a color compensation method, an image forming apparatus, and a computer readable recording medium.

2. Description of the Related Art

When a user prepares a color document, he or she may not satisfy the printed document due to lack in experience in matching or arranging colors. For example, if a user selects colors of a background image and text in a document and then prints the document on paper, he or she is often disappointed in the printed document because the colors of the document are not harmonious. Therefore, there is a need for technologies to compensate colors of a document based on a color scheme or coloration proposed by an expert prior to printing the document in order to increase user's satisfaction with the printed document.

SUMMARY

The present general inventive concept provides a color compensation apparatus capable of compensating coloration of an input image using a color scheme proposed by a professional organization, a color compensation method, an image forming apparatus, and a computer readable recording medium.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a color compensation apparatus including a color scheme analyzing unit to classify an input image into one or more objects and compute average color values for each of the classified one or more objects, a storage unit to store a color table proposed for color compensation, and a color compensating unit to compensate the average color values computed for each of the classified one or more objects using colors of the stored color table which match the computed average color values.

If a predetermined object among the classified one or more objects is represented by a single color, the color compensating unit may convert an average color value of the predetermined object into a color matching the average color value, and may compensate the color of the predetermined object.

If a predetermined object among the classified one or more objects is represented by a plurality of colors, the color compensating unit may compensate the plurality of colors of the predetermined object, taking into consideration an average color value of the predetermined object, a color matching the average color value and a color area of the matching color.

The stored color table may include a plurality of colors for each color system, and the plurality of colors may be proposed by a professional organization.

The stored color table may include a similar color range defined for each of the plurality of colors. The color compensating unit may detect the color matching the computed average color value using a similar color range to which the computed average color value belongs.

The stored color table may include a plurality of coloration schemes, of which each includes a single main color and a plurality of sub-colors ordered by their priority and which are provided by a professional organization.

The color scheme analyzing unit may divide the classified one or more objects into a main object and a plurality of sub-objects according to importance, and may compute average color values of the main object and the plurality of sub-objects. The color compensating unit may detect colors matching the computed average color values of the main object and sub-objects using a coloration scheme with the highest similarity to the computed average color values among the plurality of coloration schemes.

A similar color range may be defined for each of the main color and the plurality of sub-colors which are contained in each of the plurality of coloration schemes. The color compensating unit may detect the colors matching the computed average color values of the main object and sub-objects using a similar color range to which the computed average color values belong.

The importance may be a priority order which is previously set for each of the classified one or more objects.

The stored color table is capable of being updated.

The color compensation apparatus may further include an input image converting unit to convert the input image into Commission Internationale de l'Eclairage (CIE) LCH color space. Each of the average color values computed by the color scheme analyzing unit may be at least one of an average lightness value, an average chroma value and an average hue value of each of the classified one or more objects.

The color scheme analyzing unit may classify the input image into a background object, a text object, a graphical object and an image object according to characteristics of the input image.

The color compensation apparatus may further include an output image generating unit to convert the compensated input image into color space suitable for an output format.

The foregoing and/or other aspects and utilities of the present general inventive concept may be achieved by providing a color compensation method which includes classifying an input image into one or more objects, computing average color values for each of the classified one or more objects, and compensating the average color values computed for each of the classified one or more objects using colors of a color table which match the computed average color values. Herein, the color table may be stored for color compensation.

If a predetermined object among the classified one or more objects is represented by a single color, the compensating may include converting an average color value of the predetermined object into a color matching the average color value, and compensating the color of the predetermined object.

If a predetermined object among the classified one or more objects is represented by a plurality of colors, the compensating may include compensating the plurality of colors of the predetermined object, taking into consideration an average color value of the predetermined object, a color matching the average color value and a color area of the matching color.

The stored color table may include a plurality of colors for each color system, and the plurality of colors are proposed by a professional organization The stored color table may include a similar color range defined for each of the plurality of colors. The compensating may include detecting the color matching the computed average color value using a similar color range to which the computed average color value belongs.

The stored color table may include a plurality of coloration schemes, of which each comprises a single main color and a plurality of sub-colors ordered by their priority and which are provided by a professional organization.

The color compensation method may further include dividing the classified one or more objects into a main object and a plurality of sub-objects according to an importance, and computing average color values of the main object and the plurality of sub-objects. The compensating may include detecting colors matching the computed average color values of the main object and sub-objects using a coloration scheme with the highest similarity to the computed average color values among the plurality of coloration schemes.

A similar color range may be defined for each of the main color and the plurality of sub-colors which are contained in each of the plurality of coloration schemes. The compensating may include detecting the colors matching the computed average color values of the main object and sub-objects using a similar color range to which the computed average color values belong.

The importance may be a priority order which is previously set for each of the classified one or more objects.

The stored color table is capable of being updated.

The color compensation method may further include converting the input image into CIE LCH color space. Each of the computed average color values may be at least one of an average lightness value, an average chroma value and an average hue value of each of the classified one or more objects.

The classifying may include classifying the input image into a background object, a text object, a graphical object and an image object according to characteristics of the input image.

The color compensation method may further include converting the compensated input image into color space suitable for an output format.

The foregoing and/or other aspects and utilities of the present general inventive concept may be achieved by providing an image forming apparatus comprising a color compensation apparatus, which includes a color scheme analyzing unit to classify an input image into one or more objects, and compute average color values for each of the classified one or more objects, a storage unit to store a color table proposed for color compensation, and a color compensating unit to compensate the average color values computed for each of the classified one or more objects using colors of the stored color table which match the computed average color values.

The foregoing and/or other aspects and utilities of the present general inventive concept may be achieved by providing a computer readable recording medium having embodied thereon a computer program to execute a method, wherein the method includes classifying an input image into one or more objects, computing average color values for each of the classified one or more objects, and compensating the computed average color values using colors of the stored color table which match the computed average color values. Herein, the color table may be stored for color compensation.

The foregoing and/or other aspects and utilities of the present general inventive concept may be achieved by providing a color compensation apparatus including a color scheme analyzing unit to classify an input image into a plurality of objects and to compute average color values for each of the classified plurality of objects, and a color compensating unit to compensate the average color values computed for each of the classified plurality of objects using colors of a color table which match the computed average color values.

The color compensation apparatus may further include a storage unit to store the color table proposed for color compensation.

The color table may be received from an external source.

The color compensating unit may perform compensation by detecting colors similar to the average color values for each of the classified plurality of objects, setting the detected colors to target color values, and converting the average color values for each of the classified plurality of objects using the target color values.

The color compensating unit may perform compensation by selecting a coloration scheme similar to the average color values for each of the classified plurality of objects, and converting the average color values using the selected coloration scheme for each of the classified plurality of objects.

The foregoing and/or other aspects and utilities of the present general inventive concept may be achieved by providing a color compensation method which includes classifying an input image into a plurality of objects, computing average color values for each of the classified plurality of objects, detecting colors similar to the average color values for each of the classified plurality of objects, setting the detected colors to target color values, and converting the average color values for each of the classified plurality of objects using the target color values.

The foregoing and/or other aspects and utilities of the present general inventive concept may be achieved by providing a computer readable recording medium having embodied thereon a computer program to execute a method, wherein the method includes classifying an input image into a plurality of objects, computing average color values for each of the classified plurality of objects, detecting colors similar to the average color values for each of the classified plurality of objects, setting the detected colors to target color values, and converting the average color values for each of the classified plurality of objects using the target color values.

The foregoing and/or other aspects and utilities of the present general inventive concept may be achieved by providing a color compensation method which includes classifying an input image into a plurality of objects, computing average color values for each of the classified plurality of objects, selecting a coloration scheme similar to the average color values for each of the classified plurality of objects, and converting the average color values using the selected coloration scheme for each of the classified plurality of objects.

The selecting may be performed automatically.

The selecting may be performed manually by a user.

The selecting may be performed using a highest priority object of the classified one or more objects. The priority of the classified one or more objects may be preset by a user.

The selecting may be performed using a highest priority object of the classified one or more objects. The priority of the classified one or more objects may be automatically preset.

The foregoing and/or other aspects and utilities of the present general inventive concept may be achieved by providing a computer readable recording medium having embodied thereon a computer program to execute a method, wherein the method includes classifying an input image into a plurality of objects, computing average color values for each of the classified plurality of objects, selecting a coloration scheme similar to the average color values for each of the classified plurality of objects, and converting the average color values using the selected coloration scheme for each of the classified plurality of objects.

BRIEF DESCRIPTION OF THE DRAWINGS

Embodiments of the present general inventive concept will become apparent and more readily appreciated from the following description of the embodiments, taken in conjunction with the accompanying drawings of which:

These and/or other aspects and utilities of the present general inventive concept will become apparent and more readily appreciated from the following description of the embodiments, taken in conjunction with the accompanying drawings of which:

FIG. 6 exemplarily illustrates another color table;

DETAILED DESCRIPTION OF THE EMBODIMENTS

Figure 1:
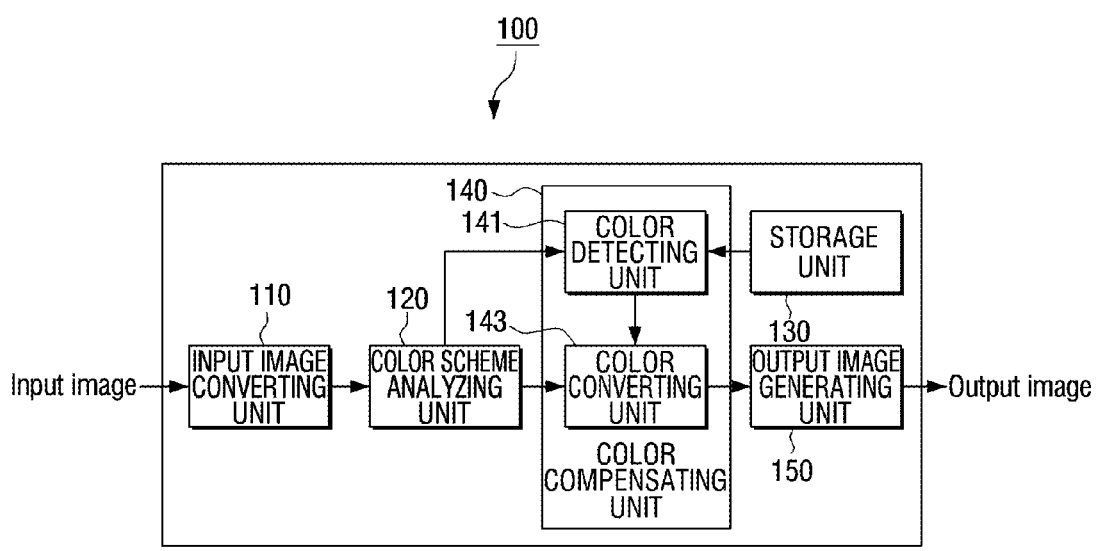
FIG. 1 illustrates a block diagram of a color compensation apparatus according to an exemplary embodiment of the present general inventive concept.

Reference will now be made in detail to the embodiments of the present general inventive concept, examples of which are illustrated in the accompanying drawings, wherein like reference numerals refer to the like objects throughout. The embodiments are described below in order to explain the present general inventive concept by referring to the figures.

FIG. 1 illustrates a block diagram of a color compensation apparatus 100 according to an exemplary embodiment of the present general inventive concept.

In FIG. 1, the color compensation apparatus 100 includes an input image converting unit 110, a color scheme analyzing unit 120, a storage unit 130, a color compensating unit 140 and an output image generating unit 150.

The input image converting unit 110 may receive an input image prepared by a user and convert the input image into a color space to recognize visual-perceptual characteristics. In this situation, the input image may be a color document, and the color space may be Commission Internationale de l'Eclairage (CIE) LAB color space, CIE LCH color space or the like. As is known in the art, CIE LAB space represents a color-opponent space with dimension L for lightness and a and b for the color-opponent dimensions, while CIE LCH space represents a subset of CIE LUV space, with dimension L for lightness and c and h for chroma and hue. In more detail, when a user prepares an input image using a computer, the input image has RGB characteristics, and the input image converting unit 110 converts the input image into CIE LCH color space.

The color scheme analyzing unit 120 may classify the input image into one or more objects according to characteristics of the input image, and may compute average color values e.g., average LCH values, for each of the one or more objects. Each of the average color values computed for each object may be at least one of an average lightness value, an average chroma value and an average hue value of each object.

In more detail, the color scheme analyzing unit 120 may classify the converted input image into a background object, a graphical object, a text object and/or an image object according to characteristics of elements forming the input image, and may compute average color values of the background object, the graphical object, the text object and the image object, respectively. Each object includes identification information regarding its characteristics, and thus it is possible for the color scheme analyzing unit 120 to distinguish the objects of the input image using the identification information.

The color scheme analyzing unit 120 may map the average color values computed for each element with the identification information of each object, may create a color combination, and may transmit the created color combination to the color compensating unit 140. The color compensating unit 140 may recognize lightness, chroma and hue characteristics of each object based on the average color values computed for each element.

Figure 2:
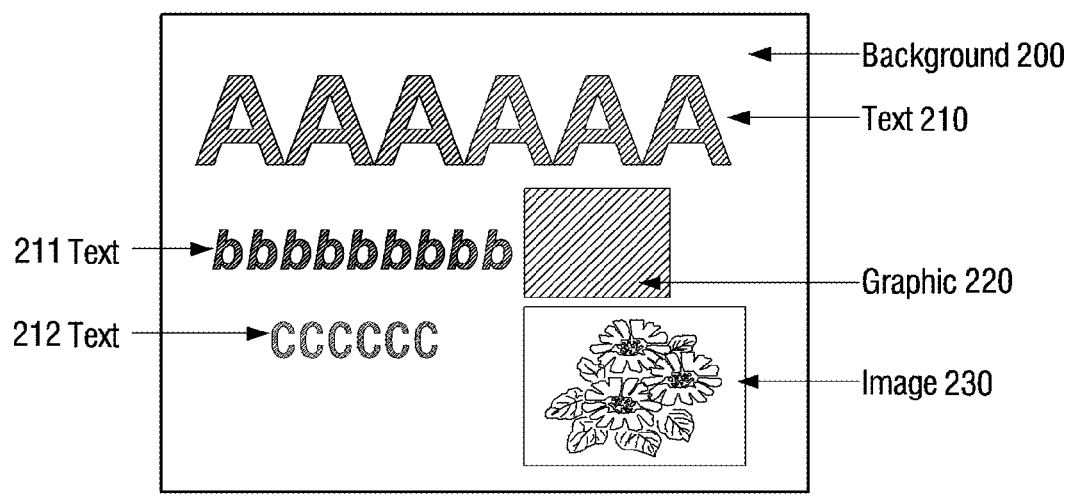
FIG. 2 exemplarily illustrates an input image, namely a document, including a plurality of objects.

FIG. 2 exemplarily illustrates an input image, namely a document, including a plurality of objects. In FIG. 2, the input image is classified into a background object 200, three text objects 210, 211, and 212, three graphical objects 220, and an image object 230.

A background object represents a background of the input image, and generally conforms to characteristics of a graphical object.

A graphical object has vector characteristics of position, size and direction, and refers to a diagram such as a circle or polygon, a line or a graph.

A text object represents letters of the input image, and has information regarding the size and color of letters.

An image object has bitmap characteristics, and refers to a photograph and image formed of pixels with a predetermined resolution. In the present general inventive concept, the image object may be selectively compensated by a user or a designer, because compensation of the image object may be delayed compared to other objects due to a variety of color information of the image object.

The color scheme analyzing unit 120 may divide the classified objects into a main object and a plurality of sub-objects according to the importance. The importance may be a priority order which is previously set for each object, or an area ratio of the objects occupying the input image. For example, if the priority order is used, a first priority, a second priority, and a third priority may be given to the background object 200, the graphical object 220, and the text object 210, respectively. In this situation, if the input image includes a plurality of the same objects, the plurality of the same objects may be ordered according to their area. Referring to FIG. 2, the background object 200 with the first priority may be set to be a main object, the graphical object 220 with the second priority may be set to be a first sub-object, and the text object 210 with the third priority may be set to be a second sub-object. If the input image includes two graphical objects, a graphical object occupying a relatively large area of the input image may be set to be a first sub-object, the other graphical object may be set to be a second sub-object, and the text object may be set to be a third sub-object.

Alternatively, if the area ratio is used, an object occupying the highest area of the image may be set to be a main object, and an object occupying the next highest area may be set to be a first sub-object. Other priority schemes may be preset or selected by a user.

In the input image as illustrated in FIG. 2, the background object 200, the graphical object 220 having the polygonal shape, text object 'A' 210, text object 'b' 211, and text object 'c' 212 are set to be a main object, a first sub-object, a second sub-object, a third sub-object, and a fourth sub-object, respectively. In this exemplary priority classification and for purposes of illustration, the image object 230 is not set as an object with a priority.

Figure 3:
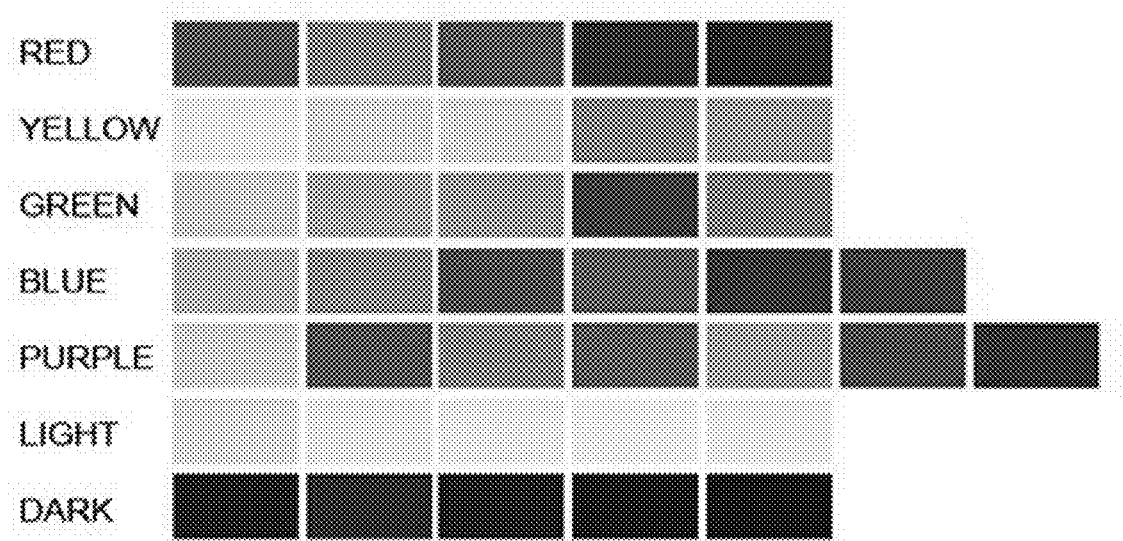
FIG. 3 exemplarily illustrates a color table.

The storage unit 130 may store a color table proposed for color compensation. The color table may include information regarding a color scheme proposed by a professional organization, and may be referred to as an expert's proposed color. The color table may be formed of a plurality of colors for each color system, as illustrated in FIG. 3.

The colors of the color table have lightness, chroma and hue values, and a similar color range can be previously set. The similar color range may be used by the color compensating unit 140 to detect a color having a value which is most similar to the computed average color value when the color table does not contain a color matching the computed average color value.

A trend forecasting organization, which may be a professional organization, may select representative colors to be in fashion, and provide exact colors such as pantone color numbers, RGB data or CIE LAB data. The expert's proposed color may be obtained by analyzing colors provided by the trend forecasting organization and a document preparation format proposed by a professional designer.

While the storage unit 130 is shown in FIG. 1 as storing a color table for color compensation, the color table may be received from an external source, such as an external storage device or from an external network device or wireless device.

The color compensating unit 140 may produce compensating color values for each object using colors of the color table stored in the storage unit 130 which match the computed average color values. Accordingly, the color compensating unit 140 may include a color detecting unit 141 and a color converting unit 143.

The color detecting unit 141 may detect a color that matches the average color value of each object from the color table stored in the storage unit 130, and may set the detected color to a target color value.

For example, when a red-based color has a hue value of 40° and a similar color range is from 30° to 50°, if a hue value of an average color value of a background object is 40°, the color detecting unit 141 may detect the red color with a hue value of 40° and may set the detected red color to a target color value of the background object. Additionally, if a hue value of an average color value of a background object is 32° which belongs to the similar color range, the color detecting unit 141 may also set the red color with a hue value of 40° to a target color value of the background object. This process may be performed in two-dimensional (2D) color space or three-dimensional (3D) color space.

The color converting unit 143 may convert the input image using the target color value of each object which is set by the color detecting unit 141.

If a predetermined object is represented by a single color, the color converting unit 143 may convert the average color value of the predetermined object into the set target color value, to perform color compensation on the predetermined object. For example, if a background object is represented by a single color, the color converting unit 143 may convert the average color value of the background object into a single color detected by the color detecting unit 141.

On the other hand, if a predetermined object is represented by various colors, the color converting unit 143 may convert each of the various colors of the predetermined object, taking into consideration an average color value of the predetermined object, a target color value matching the average color value, and a color area corresponding to the target color value. In this situation, the target color value is detected by the color detecting unit 141, and the color area corresponds to a color conversion range of the target color value. In other words, when an object is represented by a plurality of colors, the color converting unit 143 can perform color compensation in a color area illustrated in FIG. 4.

Figure 4:
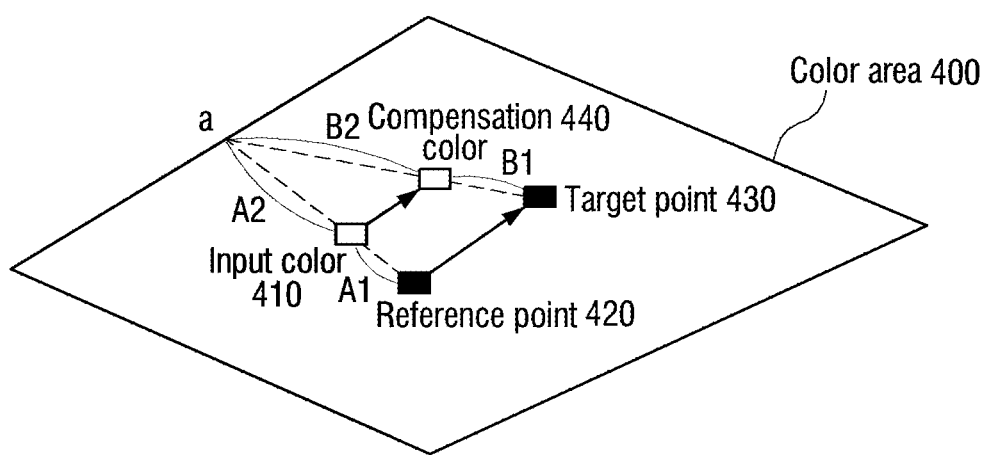
FIG. 4 illustrates a view provided to explain a method to perform color compensation in a two-dimensional (2D) color area.

FIG. 4 illustrates a view provided to explain a method to perform color compensation in a 2D color area 400. In FIG. 4, an input color 410 refers to a value of one of various colors forming a predetermined object, a reference point 420 refers to an average color value of the predetermined object, and a target point 430 refers to a target color value.

The color converting unit 143 may form a straight line from the reference point 420 to the input color 410, may extend the straight line to a boundary of the color area 400, and may connect point a, at which the straight line meets the boundary, to the target point 430. The color compensating unit 140 may then compute a distance ratio of distance A1 between the input color 410 and the reference point 420 to distance A2 between point a and the input color 410 (A1:A2), and may divide a straight line connecting point a to the target point 430 in the computed distance ratio A1:A2, so that a distance ratio between point a and the target point 430 may be B1:B2. Subsequently, the color compensating unit 140 may set a color value corresponding to a point at which the line connecting point a to the target point is divided to a compensation color 440. In this situation, A1:A2 is equal to B1:B2.

Accordingly, the color converting unit 143 may perform color compensation, taking into consideration colors i.e., input colors, which form the predetermined object, the average color value i.e., the reference point, the target color value i.e., the target point, and the relative position in the color area. As a result, the colors forming the predetermined object may be converted using the compensation color instead of using the detected target color value.

Additionally, the color converting unit 143 may perform color conversion in 3D color space, or using a hue range. This is well-known to those skilled in the art, so no further description is herein provided.

Figure 5A:
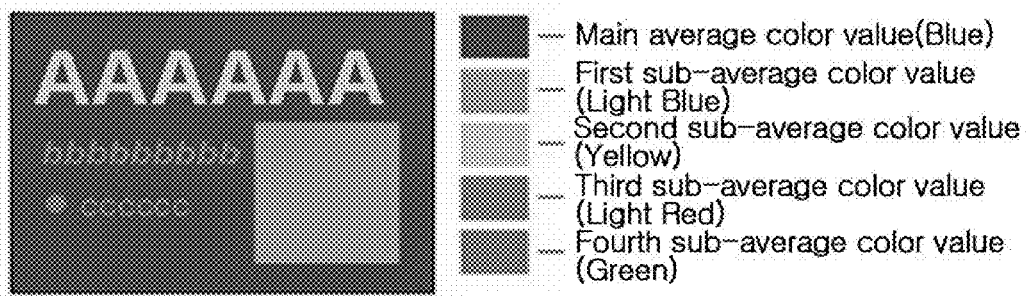
FIG. 5A exemplarily illustrates an input image prepared by a user.
Figure 5B:
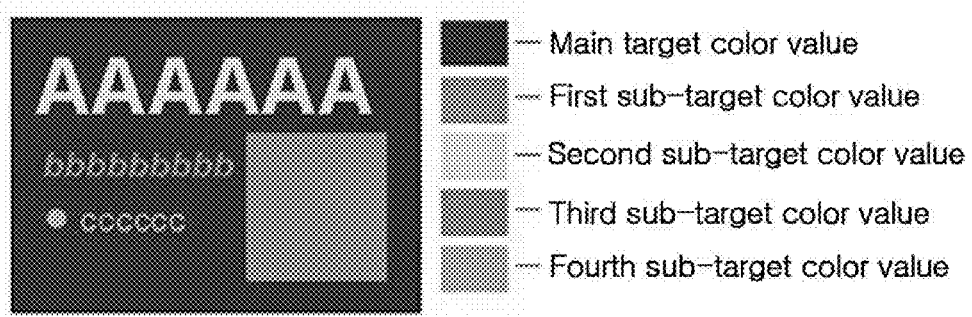
FIG. 5B exemplarily illustrates an image of which colors are compensated using the color table illustrated in FIG. 3.

FIG. 5A exemplarily illustrates an input image prepared by a user, and FIG. 5B exemplarily illustrates an image of which colors are converted using the color table illustrated in FIG. 3.

As illustrated in FIG. 5A, the input image is classified by the color scheme analyzing unit 120 into a main object corresponding to the background and first to fourth sub-objects corresponding to text or graphical representations according to priority levels assigned to background, text or graphical representations. Various priority schemes are discussed hereinabove in reference to FIG. 2. The color scheme analyzing unit 120 may compute a main average color value of the main object and first to fourth sub-average color values of the first to fourth sub-objects. The main average color value and the first to fourth sub-average color values as illustrated in FIG. 5A may be replaced with a main target color value and first to fourth sub-target color values or with compensation color values within a similar color range, using the color table and method described above with reference to FIG. 4, so that the input image may be compensated as illustrated in FIG. 5B.

Referring back to FIG. 1, the output image generating unit 150 may convert the color-compensated image into color space suitable for an output format. For example, if an input image is displayed on a monitor of a personal computer (PC), the output image generating unit 150 may generate an output image by converting the color-compensated image into RGB color space. If an input image is printed on paper using an image forming apparatus, the output image generating unit 150 may convert the format of the color-compensated image into a CMYK format and may generate an output image.

The storage unit 130 may also store a color table including a plurality of coloration schemes proposed by a color expert, as illustrated in FIG. 6. Herein, there is no limitation to the number of coloration schemes. A circle graph 600 of FIG. 6 may make each of the plurality of coloration schemes more visually accessible.

A coloration scheme may be configured with a single main target color value and a plurality of sub-target color values ordered by their priority. A similar color range may be set for each target color value. The similar color range has been described above, so no further description is herein provided.

For example, if a main color is red, an expert may select blue, green, pink and white, as a first sub-color, a second sub-color, a third sub-color and a fourth sub-color, respectively, and may then provide a first coloration scheme including the selected colors. Each of the selected colors may include at least one of lightness, chroma and hue values.

If the color table of FIG. 6 is stored in the storage unit 130, the color compensating unit 140 may perform color compensation using a coloration scheme with the highest similarity to the average color values of the main object and sub-objects computed by the color scheme analyzing unit 120, among the plurality of coloration schemes.

In more detail, the color detecting unit 141 may check the average color value of the main object in the color combination provided by the color scheme analyzing unit 120, may detect a main color having a value that is the same as or most similar to the checked average color value from among a plurality of main colors in the plurality of coloration schemes, and may then set the detected main color to a main target color value.

For example, if a main object of an input image is a background object, and if an average color value of the background object corresponds to blue, the color detecting unit 141 may select a second coloration scheme and a third coloration scheme as candidates among the plurality of coloration schemes. In more detail, if the average color value of the background object does not completely match blue of the second coloration scheme and third coloration scheme, but belongs to a similar color range of blue, the color detecting unit 141 may select the second coloration scheme and third coloration scheme as candidates.

Additionally, if an average color value of a first sub-object of the input image corresponds to light blue, the color detecting unit 141 may select the third coloration scheme, in which light blue is set to represent a first sub-object, among the second and third coloration schemes. Accordingly, even when the average color values of the second to fourth sub-objects correspond to colors other than yellow, green and grey, the color detecting unit 141 may set target color values of the second to fourth sub-objects to yellow, green and grey. A main color and first to fourth sub-colors of the selected coloration scheme may be set to be a main target color value and first to fourth sub-target color values, respectively.

The color converting unit 143 may apply color compensation to each object of the input image using the selected coloration scheme. In more detail, the color converting unit 143 may convert the average color value of the main object of the input image using the main color of the selected coloration scheme, that is, using the main target color value, and may convert the average color values of the first to fourth sub-objects of the input image using the first to fourth sub-target color values.

Figure 5C:
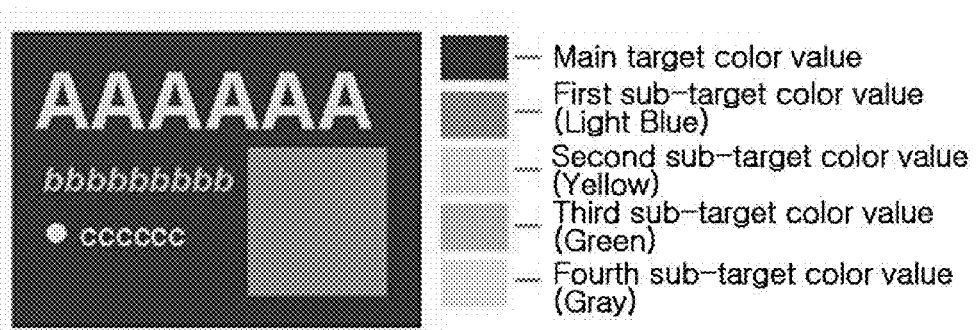
FIG. 5C exemplarily illustrates an image of which colors are compensated using a color table illustrated in FIG. 6.

FIG. 5C exemplarily illustrates an image of which colors are converted using the third coloration scheme.

Referring to FIGS. 5A and 5C, blue (namely, a main average color value of the input image illustrated in FIG. 5A), light blue (namely, a first sub-average color value), yellow (namely, a second sub-average color value), and light red (namely, a third sub-average color value) may be converted using blue, light blue, yellow and green of the third coloration scheme, respectively. Additionally, green (namely, a fourth average color value) may be converted using gray with different chroma and different lightness. Accordingly, the input image of FIG. 5A may be converted as illustrated in FIG. 5C.

In this situation, if one of the main object and first to fourth sub-objects of the input image is represented by a plurality of colors, the color compensating unit 140 may convert the input image using the colors of the third coloration scheme in the same manner as the method of FIG. 4.

Figure 7:
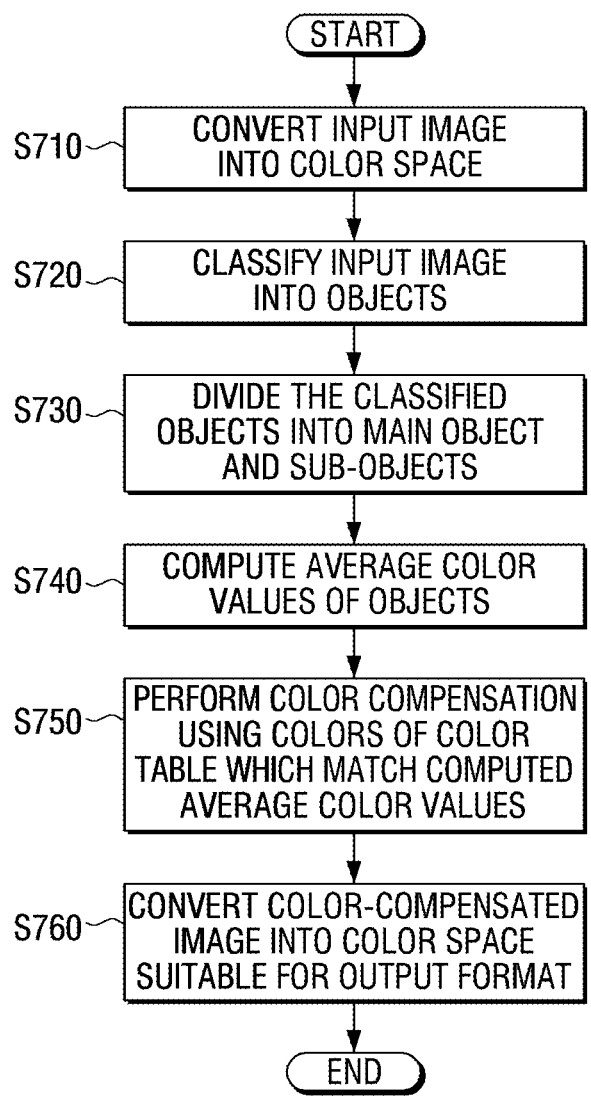
FIG. 7 illustrates a flowchart of a color compensation method according to an exemplary embodiment of the present general inventive concept.

FIG. 7 illustrates a flowchart of a color compensation method according to an exemplary embodiment of the present general inventive concept.

The input image converting unit 110 may convert an input image into color space suitable for color compensation in operation S710. As described hereinabove, the color space may be CIE LCH color space, or another suitable color space.

The color scheme analyzing unit 120 may classify the input image into one or more objects in operation S720. During operation S720, the color scheme analyzing unit 120 may analyze characteristics of the input image, to classify the input image into a background object, a graphical object, an image object and a text object. The color scheme analyzing unit 120 may divide the classified objects into a main object and a plurality of sub-objects in operation S730. During operation S730, the color scheme analyzing unit 120 may divide the classified objects into the main object and the plurality of sub-objects according to the area ratio of the objects occupying the input image or according to the priority order set for each object. Other priority schemes may be preset or selected by a user.

After operation S730, the color scheme analyzing unit 120 may compute average color values of the main object and the plurality of sub-objects in operation S740.

The color compensating unit 140 may compensate the computed average color values of the objects using colors of the color table stored in the storage unit 130 which match the computed average color values in operation S750. Operation S750 will be described in detail with reference to FIGS. 8 and 9 below.

The output image generating unit 150 may convert the color-compensated image into color space suitable for an output format in operation S760.

Figure 8:
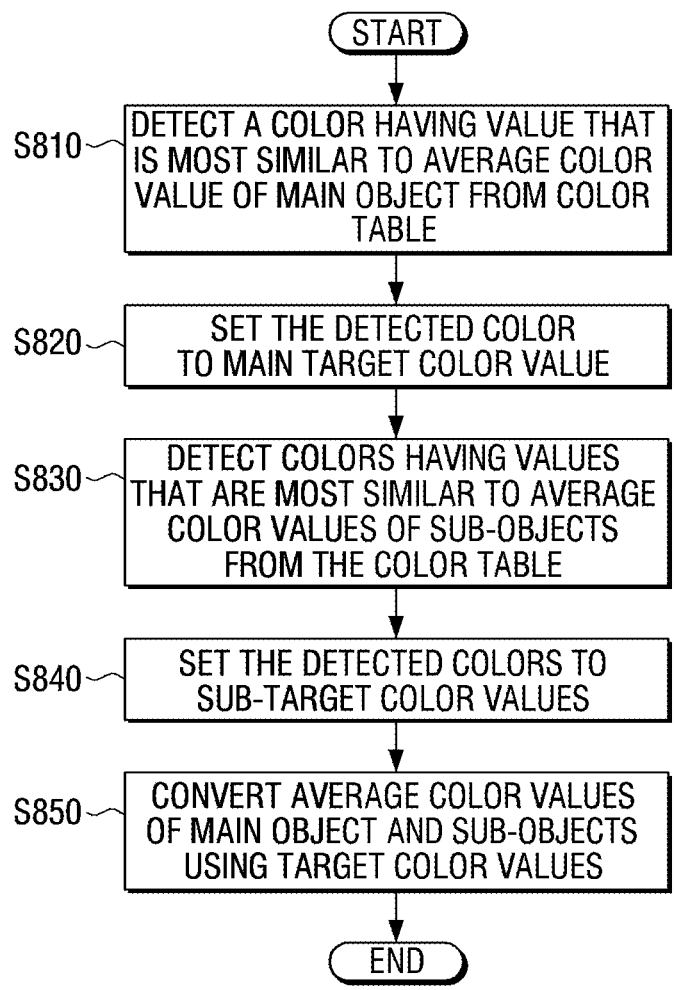
FIG. 8 illustrates a flowchart of an example of color compensation performed in operation S750 of FIG. 7.

FIG. 8 illustrates a flowchart of an example of color compensation performed in operation S750 of FIG. 7.

When the storage unit 130 stores the color table including a plurality of colors for each color system as illustrated in FIG. 3, the color compensating unit 140 may detect a color having a value that is most similar to or the same as the average color value of the main object of the input image, from the color table in operation S810.

The color compensating unit 140 may set the color detected in operation S810 to a main target color value in operation S820.

After operation S820, the color compensating unit 140 may detect colors having values that are most similar to or the same as the average color values of the sub-objects of the input image, from the color table in operation S830, and may set the detected colors to sub-target color values in operation S840. In this situation, the colors detected in operations S810 and S830 refer to colors matching the average color values, and the similar color range described above with reference to FIG. 3 may be used to detect the colors having values that are most similar to or the same as the average color values.

The color compensating unit 140 may convert the average color values of the main object and sub-objects using the target color values set at operations S820 and S840, in operation S850. In more detail, during operation S850, the color compensating unit 140 may convert the average color value of the main object using the main target color value of operation S820, and may convert the average color values of the sub-objects using the sub-target color values of operation S840.

In operation S850, if one of the plurality of objects is represented by a single color, the color compensating unit 140 may convert an average color value of the object into a target color value to perform color compensation. Additionally, if one of the plurality of objects is represented by various colors, the color compensating unit 140 may perform color compensation using the method described above with reference to FIG. 4. In this situation, the color compensating unit 140 may compensate the various colors based on gradations and relationship of the various colors, rather than using a single color, and accordingly it is possible to obtain a more natural image. In other words, the input image of FIG. 5A may be compensated as illustrated in FIG. 5B through the operations of FIGS. 7 and 8.

Figure 9:
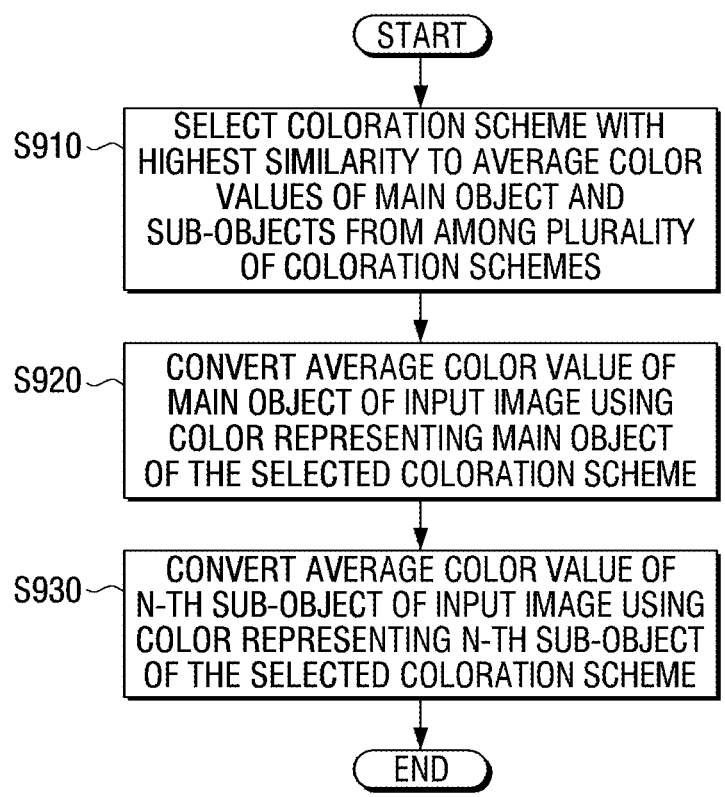
FIG. 9 illustrates a flowchart of another example of color compensation performed in operation S750 of FIG. 7.

FIG. 9 illustrates a flowchart of another example of color compensation performed in operation S750 of FIG. 7.

When the storage unit 130 stores the color table including a plurality of coloration schemes as illustrated in FIG. 6, the color compensating unit 140 may select a coloration scheme with the highest similarity to the average color values of the main object and sub-objects, from among the plurality of coloration schemes in operation S910. Alternatively, the user may select a desired coloration scheme.

The color compensating unit 140 may convert the average color value of the main object of the input image using a color representing a main object of the selected coloration scheme in operation S920. In more detail, the color compensating unit 140 may set the color of the main object to be a main target color value, and may convert the average color value of the main object into the main target color value or into a color similar to the main target color value using the method described with reference to FIG. 4.

After the color of the main object is completely compensated, the color compensating unit 140 may convert an average color value of a first, second, . . . , and n-th sub-object of the input image using a color representing a first, second, . . . , and n-th sub-object of the selected coloration scheme in operation S930. In more detail, the color compensating unit 140 may set the color of the first, second, . . . , and n-th sub-object to be a first, second, . . . , and n-th sub-target color value, and may convert the average color value of the first, second, . . . , and n-th sub-object into the first, second, . . . , and n-th sub-target color value or into a color similar to the first, second, . . . , and n-th sub-target color value using the method described with reference to FIG. 4. Therefore, the input image of FIG. 5A may be compensated as illustrated in FIG. 5C through the operations of FIGS. 7 and 9.

According to the present general inventive concept, it is possible to compensate a document prepared by a user using a color scheme proposed by an expert and print the compensated document, thereby increasing user's satisfaction with coloration. Additionally, it is possible to update the color scheme proposed by the expert at any time, and is possible for fashion-conscious users to utilize the color scheme more efficiently.

When the color table of FIG. 3 is used, a user may perform color compensation using colors of the color table of FIG. 3 which have the highest similarity to colors of an input image set by the user. Alternatively, when the color table of FIG. 6 is used, the user may compensate colors of the input image using colors proposed by an expert although some colors of the color table of FIG. 6 differ from colors set by the user. Therefore, it is possible to increase user's satisfaction with an output image.

The color compensation apparatus 100 described above may be included in any apparatus capable of storing or displaying and printing an image, for example an image forming apparatus (not illustrated), a PC (not illustrated), an apparatus equipped with image processing software or other apparatuses.

Figure 10:
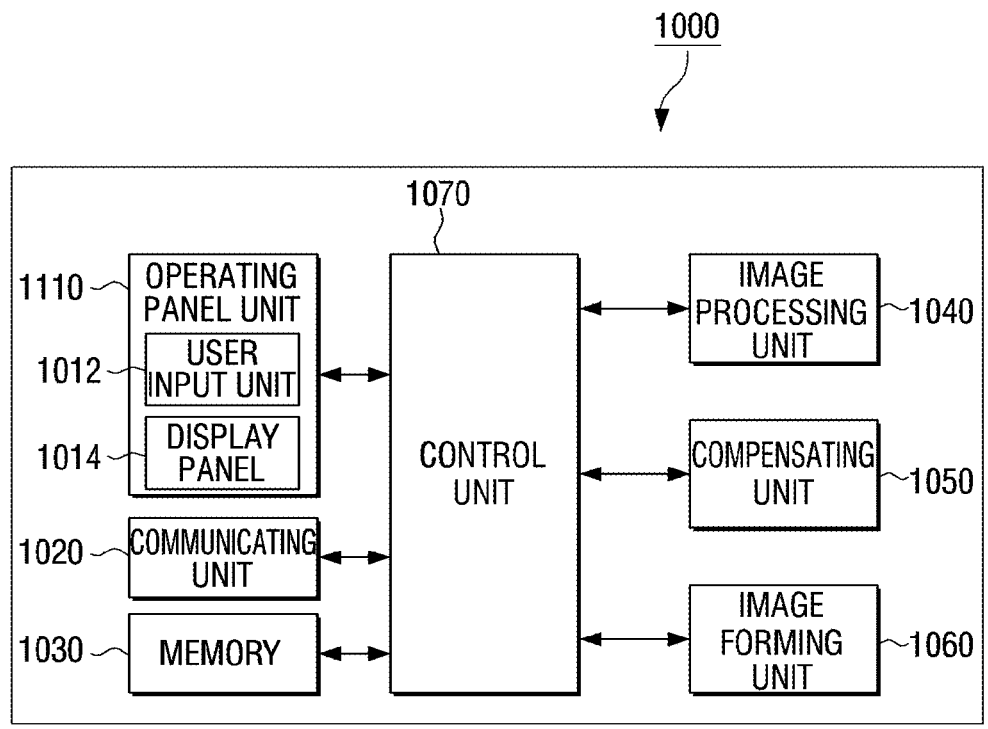
FIG. 10 illustrates a block diagram of an image forming apparatus to which the color compensation apparatus of FIG. 1 is applied according to an exemplary embodiment of the present general inventive concept.

An image forming apparatus may be a printer, a copier, a facsimile machine or a multifunctional peripheral (MFP). FIG. 10 illustrates a block diagram of an image forming apparatus 1000.

The image forming apparatus 1000 includes an operating panel unit 1010, a communicating unit 1020, a memory 1030, an image processing unit 1040, a compensating unit 1050, an image forming unit 1060 and a control unit 1070.

The operating panel unit 1010 may include a user input unit 1012 and a display panel 1014. The user input unit 1012 may include various function keys or a touch screen, and may receive a user command input by a user and transmit a request in response to the received user command to the control unit 1070.

Figure 11:
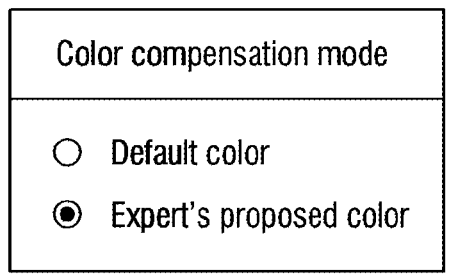
FIG. 11 exemplarily illustrates a window to select a color compensation mode displayed on a screen.

The display panel 1014 can be controlled by the control unit 1070 to display information on the state of the image forming apparatus 1000, and to display a window through which a user can select a color compensation mode as illustrated in FIG. 11. The display panel 1014 may be implemented as a touch screen or a liquid crystal display (LCD).

The communicating unit 1020 may be communicably connected to a computer and a server to provide a variety of information, via a communication network (not illustrated). Accordingly, it is possible for a user to update the color table stored in the memory 1030 to the latest version by downloading the latest version of the color table from a server of a professional organization or the Internet network which provides a color table.

Additionally, the communicating unit 1020 may provide an interface to which an external memory is detachably attached. In this situation, if the external memory in which the latest version of the color table is currently stored is connected to the communicating unit 1020, a user can update the color table stored in the memory 1030 to the latest version by downloading the latest version of the color table from the external memory.

The memory 1030 may store various programs necessary to realize the functions of the image forming apparatus 1000, firmware required for color compensation to be performed by the compensating unit 1050, and a color table proposed for color compensation by a professional organization. In this situation, the compensating unit 1050 may not require the storage unit 130.

The image processing unit 1040 may process the window to be displayed on the display panel 1014 as illustrated in FIG. 11.

The compensating unit 1050 may compensate colors of an input image provided by a PC connected to the image forming apparatus 1000 via the communicating unit 1020, or colors of an input image stored in the memory 1030. The compensating unit 1050 is configured in the same manner as the color compensation apparatus 100 described above with reference to FIGS. 1 to 7, so no further description is herein provided. The compensating unit 1050 may be a processor to execute color compensation.

The image forming unit 1060 can generate image data of a document and form an image. For example, if the image forming unit 1060 includes a scanner (not illustrated), a print engine (not illustrated), and a modem (not illustrated), the image forming unit 1060 may scan a document, perform printing on paper, perform copying, or perform fax data transmission and reception.

The control unit 1070 can control an overall operation of the image forming apparatus 1000 using a control program stored in the memory 1030. For example, if a user selects a button for color compensation, the control unit 1070 can control the image processing unit 1040 to generate and display the window of FIG. 11 on the display panel 1014. If the user selects an 'expert's proposed color' option from the window of FIG. 11 using the user input unit 1012, the control unit 1070 can control the color compensating unit 1050 to compensate colors of the input image.

Alternatively, if the user selects a 'default color' option from the window of FIG. 11, the control unit 1070 can print the document without performing color compensation of the input image.

The control unit 170 can control the communicating unit 1020 to update the color table and firmware to the latest version by downloading the latest version of the color table and color scheme firmware.

The color compensation apparatus 100 may be mounted in a PC using a driver of the image forming apparatus 1000 or using an application for color compensation. In this situation, the storage unit 130 of the color compensation apparatus 100 may be a memory included in the PC.

A user can request a display of the window of FIG. 11 using a mouse or keyboard of a computer, and can select the 'expert's proposed color' option from the window of FIG. 11 displayed on a monitor of the computer to request color compensation. The window of FIG. 11 may be displayed on a user interface provided by the driver of the image forming apparatus 1000. The color compensation apparatus 100 installed in the computer may compensate colors of the input image using a color compensation method described above with reference to FIGS. 1 to 7 in response to the user request for color compensation.

Additionally, the user can update the color table of the color compensation apparatus 100 installed in the computer, by re-installing a driver having the latest version of the color table, or downloading the latest version of the color table from a server of a professional organization over network, using a detachable memory card, or by any other suitable method.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A color compensation apparatus comprising:
a color scheme analyzing unit to classify an input image into a plurality of objects and to compute average color values for each of the classified plurality of objects;
a storage unit to store a color table proposed for color compensation; and
a color compensating unit to compensate the average color values computed for each of the classified plurality of objects using colors of the stored color table which match the computed average color values,
wherein the stored color table comprises a plurality of coloration schemes, of which each comprises a single main color and a plurality of sub-colors ordered by their priority and which are provided by a professional organization,
the color scheme analyzing unit divides the classified plurality of objects into a main object and a plurality of sub-objects according to importance, and computes average color values of the main object and the plurality of sub-objects, and
the color compensating unit detects colors matching the computed average color values of the main object and sub-objects using a coloration scheme with the highest similarity to the computed average color values among the plurality of the coloration schemes.

2. The color compensation apparatus according to claim 1, wherein, if a predetermined object among the classified plurality of objects is represented by a single color, the color compensating unit converts an average color value of the predetermined object into a color matching the average color value, and compensates the color of the predetermined object.

3. The color compensation apparatus according to claim 1, wherein, if a predetermined object among the classified plurality of objects is represented by a plurality of colors, the color compensating unit compensates the plurality of colors of the predetermined object, taking into consideration an average color value of the predetermined object, using a color matching the average color value and a color area of the matching color.

4. The color compensation apparatus according to claim 1, wherein the stored color table comprises a plurality of colors for each color system, and the plurality of colors are proposed by a professional organization.

5. The color compensation apparatus according to claim 4, wherein the stored color table comprises a similar color range defined for each of the plurality of colors, and
the color compensating unit detects the color matching the computed average color value using a similar color range to which the computed average color value belongs.

6. The color compensation apparatus according to claim 1, wherein a similar color range is defined for each of the main color and the plurality of sub-colors which are contained in each of the plurality of coloration schemes, and
the color compensating unit detects the colors matching the computed average color values of the main object and sub-objects using a similar color range to which the computed average color values belong.

7. The color compensation apparatus according to claim 1, wherein the importance is a priority order which is previously set for each of the classified plurality of objects.

8. The color compensation apparatus according to claim 1, wherein the stored color table is capable of being updated.

9. The color compensation apparatus according to claim 1, further comprising:
an input image converting unit to convert the input image into Commission Internationale de l'Eclairage (CIE) LCH color space,
wherein each of the average color values computed by the color scheme analyzing unit is at least one of an average lightness value, an average chroma value and an average hue value of each of the classified plurality of objects.

10. The color compensation apparatus according to claim 1, wherein the color scheme analyzing unit classifies the input image into a background object, a text object, a graphical object and an image object according to characteristics of the input image.

11. The color compensation apparatus according to claim 1, further comprising:
an output image generating unit to convert the compensated input image into color space suitable for an output format.

12. A color compensation method, comprising:
classifying an input image into a plurality of objects using a color scheme analyzing unit;
computing average color values for each of the classified plurality of objects using the color scheme analyzing unit;
compensating the average color values computed for each of the classified plurality of objects using colors of a color table which match the computed average color values using a color compensating unit; and
dividing the classified plurality of objects into a main object and a plurality of sub-objects according to an importance, and computing average color values of the main object and the plurality of sub-objects;
wherein the color table is stored for color compensation,
the stored color table comprises a plurality of coloration schemes, of which each comprises a single main color and a plurality of sub-colors ordered by their priority and which are provided by a professional organization, and
wherein the compensating comprises detecting colors matching the computed average color values of the main object and sub-objects using a coloration scheme with the highest similarity to the computed average color values among the plurality of coloration schemes.

13. The color compensation method according to claim 12, wherein, if a predetermined object among the classified plurality of objects is represented by a single color, the compensating comprises converting an average color value of the predetermined object into a color matching the average color value, and compensating the color of the predetermined object.

14. The color compensation method according to claim 12, wherein, if a predetermined object among the classified plurality of objects is represented by a plurality of colors, the compensating comprises compensating the plurality of colors of the predetermined object, taking into consideration an average color value of the predetermined object, using a color matching the average color value and a color area of the matching color.

15. The color compensation method according to claim 12, wherein the stored color table comprises a plurality of colors for each color system, and the plurality of colors are proposed by a professional organization.

16. The color compensation method according to claim 14, wherein the stored color table comprises a similar color range defined for each of the plurality of colors, and
the compensating comprises detecting the color matching the computed average color value using a similar color range to which the computed average color value belongs.

17. The color compensation method according to claim 12, wherein a similar color range is defined for each of the main color and the plurality of sub-colors which are contained in each of the plurality of coloration schemes, and
the compensating comprises detecting the colors matching the computed average color values of the main object and sub-objects using a similar color range to which the computed average color values belong.

18. The color compensation method according to claim 12, wherein the importance is a priority order which is previously set for each of the classified plurality of objects.

19. The color compensation method according to claim 12, wherein the stored color table is capable of being updated.

20. The color compensation method according to claim 12, further comprising:
converting the input image into Commission Internationale de l'Eclairage (CIE) LCH color space,
wherein each of the computed average color values is at least one of an average lightness value, an average chroma value and an average hue value of each of the classified plurality of objects.

21. The color compensation method according to claim 12, wherein the classifying comprises classifying the input image into a background object, a text object, a graphical object and an image object according to characteristics of the input image.

22. The color compensation method according to claim 12, further comprising:
converting the compensated input image into color space suitable for an output format.

* * * * *